US009565968B2

(12) United States Patent
Fin (10) Patent No.: US 9,565,968 B2
(45) Date of Patent: Feb. 14, 2017

(54) BEVERAGE PRODUCING DEVICE WITH A DUAL-POSITION WATER CONTAINER

(71) Applicant: KONINKLIJKE PHILIPS N.V., Eindhoven (NL)

(72) Inventor: Giuseppe Fin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 253 days.

(21) Appl. No.: 14/401,935

(22) PCT Filed: May 14, 2013

(86) PCT No.: PCT/IB2013/053925
§ 371 (c)(1),
(2) Date: Nov. 18, 2014

(87) PCT Pub. No.: WO2013/175346
PCT Pub. Date: Nov. 28, 2013

(65) Prior Publication Data
US 2015/0144004 A1    May 28, 2015

Related U.S. Application Data

(60) Provisional application No. 61/650,539, filed on May 23, 2012.

(51) Int. Cl.
*A47J 31/46* (2006.01)
*A47J 31/44* (2006.01)

(52) U.S. Cl.
CPC .............. *A47J 31/46* (2013.01); *A47J 31/44* (2013.01)

(58) Field of Classification Search
CPC .................................. A47J 31/46; A47J 31/44
USPC ........................................................ 99/300
See application file for complete search history.

(56) References Cited

U.S. PATENT DOCUMENTS

| 4,694,738 A | | 9/1987 | Tarozzi | |
|---|---|---|---|---|
| 4,704,954 A | * | 11/1987 | Mollenhoff | A47J 31/005 99/279 |
| 5,274,736 A | * | 12/1993 | Rohr, Jr. | A47J 31/005 219/437 |
| D350,872 S | * | 9/1994 | Zeller | A47J 31/547 D7/305 |
| 5,832,809 A | * | 11/1998 | Gras | A47J 31/547 219/689 |
| 5,964,141 A | * | 10/1999 | Andrew | A47J 31/0573 99/280 |
| 6,003,569 A | * | 12/1999 | Williams | C02F 1/008 141/18 |
| 6,123,010 A | * | 9/2000 | Blackstone | A47J 31/005 99/279 |

(Continued)

FOREIGN PATENT DOCUMENTS

| JP | 2004270964 A | 9/2004 |
|---|---|---|
| WO | 2010032271 A1 | 3/2010 |
| WO | 2011089210 A1 | 7/2011 |

*Primary Examiner* — Sean Michalski (57) ABSTRACT

The beverage producing device comprises a housing (3) and a removable water container (9) which is designed to be connected to the outside of said housing (3) in an operative position, when the device is in use. The water container is further designed to be recoverable in an inoperative position inside a recovery seat (27) formed by said housing or parts thereof, when the device is not in use.

14 Claims, 8 Drawing Sheets

(56) References Cited

U.S. PATENT DOCUMENTS

| | | | | |
|---|---|---|---|---|
| 6,405,637 B1* | 6/2002 | Cai | ............... | A47J 31/002 |
| | | | | 99/293 |
| 6,857,351 B2* | 2/2005 | Cutter | ............... | A47J 31/54 |
| | | | | 99/279 |
| 7,458,316 B2* | 12/2008 | Scelza | ............... | A47J 31/005 |
| | | | | 126/609 |
| 7,997,187 B2* | 8/2011 | Garman | ............... | A47J 31/0573 |
| | | | | 99/304 |
| 8,646,379 B2* | 2/2014 | Lai | ............... | A47J 31/3623 |
| | | | | 426/433 |
| 8,887,622 B2* | 11/2014 | Bentley | ............... | A47J 31/44 |
| | | | | 99/275 |
| 8,973,485 B2* | 3/2015 | Krauchi | ............... | A47J 31/4403 |
| | | | | 99/279 |
| 9,402,503 B2* | 8/2016 | Meyl | ............... | A47J 31/547 |
| 2003/0037680 A1 | 2/2003 | Rolland | | |
| 2006/0086256 A1* | 4/2006 | Heinze | ............... | A47J 27/2105 |
| | | | | 99/279 |
| 2011/0265658 A1 | 11/2011 | Talon | | |
| 2015/0144003 A1* | 5/2015 | Talon | ............... | A47J 31/005 |
| | | | | 99/295 |
| 2015/0230651 A1* | 8/2015 | Molayem | ............... | A47J 31/0636 |
| | | | | 99/322 |
| 2016/0120360 A1* | 5/2016 | Saunders | ............... | A47J 31/4403 |
| | | | | 99/295 |

* cited by examiner

BEVERAGE PRODUCING DEVICE WITH A DUAL-POSITION WATER CONTAINER

This application is the U.S. National Phase application under 35 U.S.C. §371 of International Application No. PCT/IB2013/053925, filed on Mar. 14, 2013, which claims the benefit of U.S. Provisional Application No. 61/650,539 filed on May 23, 2012. These applications are hereby incorporated by reference herein.

TECHNICAL FIELD

The present invention concerns beverage producing devices, in particular but not exclusively coffee producing devices, for example beverage producing devices handling capsules, pods, cartridges, sachets or other single serving packages, containing pre-packaged ingredients for the production of a beverage by means by hot and possibly pressurised water.

BACKGROUND ART

A beverage producing device of the above mentioned type is disclosed for example in WO 2010/032271.

These beverage producing devices are becoming more and more popular and efforts are being made to reduce the costs and the dimension thereof, as well as the packaging and shipping costs and to make their use more practical also in houses where little space is available.

BRIEF DESCRIPTION OF THE INVENTION

According to the invention, a beverage producing device is provided, comprising a housing and a removable water container designed to be connected to the housing in an operative position, in fluid communication with a water inlet connection, when the device is in use, and to be detached from the water inlet connection and receivable in an inoperative position inside a recovery seat provided in the device, when the device is not in use.

With such arrangement the water container can be recovered in the seat during storage or transportation, thus reducing the overall dimensions of the device. A simple an inexpensive device is thus provided, which requires little space when packaged, stored or transported. Packaging costs are also reduced, thanks to the smaller amount of packaging material required, which further results in a reduced environment impact.

Within the present disclosure, a beverage producing device shall be understood as a device capable of producing any edible liquid product for human consumption. For instance, the beverage producing device can be a coffee maker, for producing coffee or coffee-based beverages. In other embodiments the device can be designed for producing hot or cold beverages of different nature. In broad terms, a beverage producing device according to the invention can be designed to produce hot water, for the preparation of tea, infusions, instant beverages or the like. In the simplest configuration, the beverage producing device could comprise a pump and a water heater, to dispense hot water. In other embodiment, the beverage producing device can comprise a beverage producing unit arranged in the housing and in direct or indirect fluid communication with the water connection on one side and with a beverage dispensing spout on the other. The beverage producing unit can comprise a brewing chamber or the like. The beverage producing unit can be designed for use in combination with single serving pods, capsules or cartridges. In other embodiments the beverage producing unit can be designed for use with loose products, e.g. coffee powder, tea leafs or the like.

According to some embodiments, the water container can be attached to the housing so as to be partly or entirely outside the housing, when the device is in use. In preferred embodiments, the seat wherein the water container is received when not in use can be formed by the housing or parts thereof. For example, the seat can be formed between two parts frontally projecting from a main body of the housing. A first one of said parts can be or form a cup support, i.e. a surface or projecting body or part of the device, on which a beverage collecting container, such as a cup, can be positioned for collecting the beverage dispensed from a beverage dispensing spout. A drip tray can be provided in said part or be formed thereby. A second part can be a projection supporting a beverage dispensing spout, for example such second part can comprise a projecting portion of the housing, wherein the beverage dispensing spout is at least partly arranged, and wherefrom it can partly project towards the cup support.

In preferred embodiments, the seat, wherein the water container is received when not in use, is contained in the footprint of the housing. Preferably, in the non-use position, the container is entirely contained in the footprint of the housing. The footprint is the overall dimension of the housing in a top view. A particularly compact dimension of the device is thus achieved.

According to some embodiments, a beverage producing device is provided, comprising: a housing having a front side and a back side; a cup support, for supporting a beverage collecting container, which cup support projects from said front side of said housing; an upper projection extending from the front side of the housing; a beverage dispensing spout associated to the upper projection and arranged at a distance from the cup support and placed above the latter when the device is in an operative position. The device further comprises a beverage producing unit, for example a brewing unit for the production of coffee or the like. The beverage producing unit is housed in the housing and in fluid communication with the beverage dispensing spout. Furthermore, the device also comprises a removable water container; which, when in the operation position, is in fluid communication with said beverage producing unit, e.g. through a water pump which supplies water to the beverage producing unit. The upper projection and the cup support form therebetween a recovery seat for the removable water container, such that the water container can be at least partly or entirely housed in the recovery seat when the device is not in use.

In some embodiments the back side of the housing can be provided with an engaging member for removably engaging the removable water container to said housing. The engaging member can be arranged between a bottom and a top of said housing, such that the water container is supported at an intermediate height between the top of the beverage producing device and a supporting plane on which the device is placed, e.g. a table, a kitchen counter or a shelf.

In some embodiments, the engaging member is designed and arranged to provide a shape-engagement of said water container to said housing. A shape engagement, or shape connection, is to be understood as an arrangement which allows the water container to be connected to and disconnected from the housing without the need for a tool. Preferably the arrangement is such that the container can be supported in a cantilever fashion from the housing, preferably without requiring a surface or support underneath, but projecting from a preferably approximately vertical side of the housing. When the water container is connected to the housing, the water container can be sufficiently distanced from the bottom of the housing such that for example an electric cable for connecting the device to an electric socket can extend underneath the water container.

In some embodiments the engaging member for engaging the water container to the housing is designed and arranged to engage the water container to the housing by moving the water container vertically downwardly along the side of said housing where the engaging member is arranged, for example the back side, i.e. the side opposite the one on which the recovery seat for the container is provided.

In some exemplary embodiments the engaging member comprises a recess in the side of said housing and the water container comprises a projection, or vice versa. The projection and the recess are designed to mutually engage so as to provide a reversible mechanical connection of the water container to the housing. In some embodiments the housing is provided with inclined diverging or converging edges, engaging into correspondingly shaped slots provided in the water container, or vice versa.

The housing can be comprised of a niche. The water inlet connection can be arranged in the niche. The niche can be arranged for example at the back side or along an edge of the housing. The water inlet connection can be in direct or indirect fluid communication with the beverage producing unit. Direct or indirect fluid communication means that additional components, members, devices or elements can be arranged between the water inlet connection and the beverage producing unit, such as a pump and a water heater.

A fluid passageway is formed between the water container and the beverage producing unit, so that water drawn from the water container is delivered through the beverage producing unit to prepare the beverage. The water container can in turn comprise a water outlet, arranged at or near the bottom of the water container for engagement with the water inlet connection when the water container is engaged to the housing. In some embodiments the niche is opened on the back side of said housing. For example, the niche can be arranged along an edge of the back side of the housing.

The water container can be simply placed in the recovery seat or some arrangement can be provided for reversibly retaining said water container in said recovery seat. For example, a resilient latch, a hooking member or similar devices can be provided to selectively engage and disengage the water container.

In some embodiments the housing of the device comprises an elongated projection extending along the side wall, whereto the water container is attached to the housing. The water container is correspondingly recessed so that the elongated projection of the housing is received in the recess of the container. Mutual engaging elements are provided along the elongated projection and in the recessed portion of the water container. The water container can be engaged to and disengaged from the housing by moving it along the elongated projection, with the elongated projection arranged in the recessed portion of the water container.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following description refers to an application of the invention in a coffee machine, but it should be understood that the invention can be embodied in other different kinds of beverage producing devices or also in different kinds of apparatus, machines or devices for handling edible products. The following description will also specifically refer to a brewing unit, but a different beverage producing unit can be used, e.g. for the production of a hot or cold beverage which does not require brewing, but for instance mixing or diluting water and one or more beverage ingredients.

A first embodiment of the device is illustrated in FIGS. 1 to 9.

Figure 1:
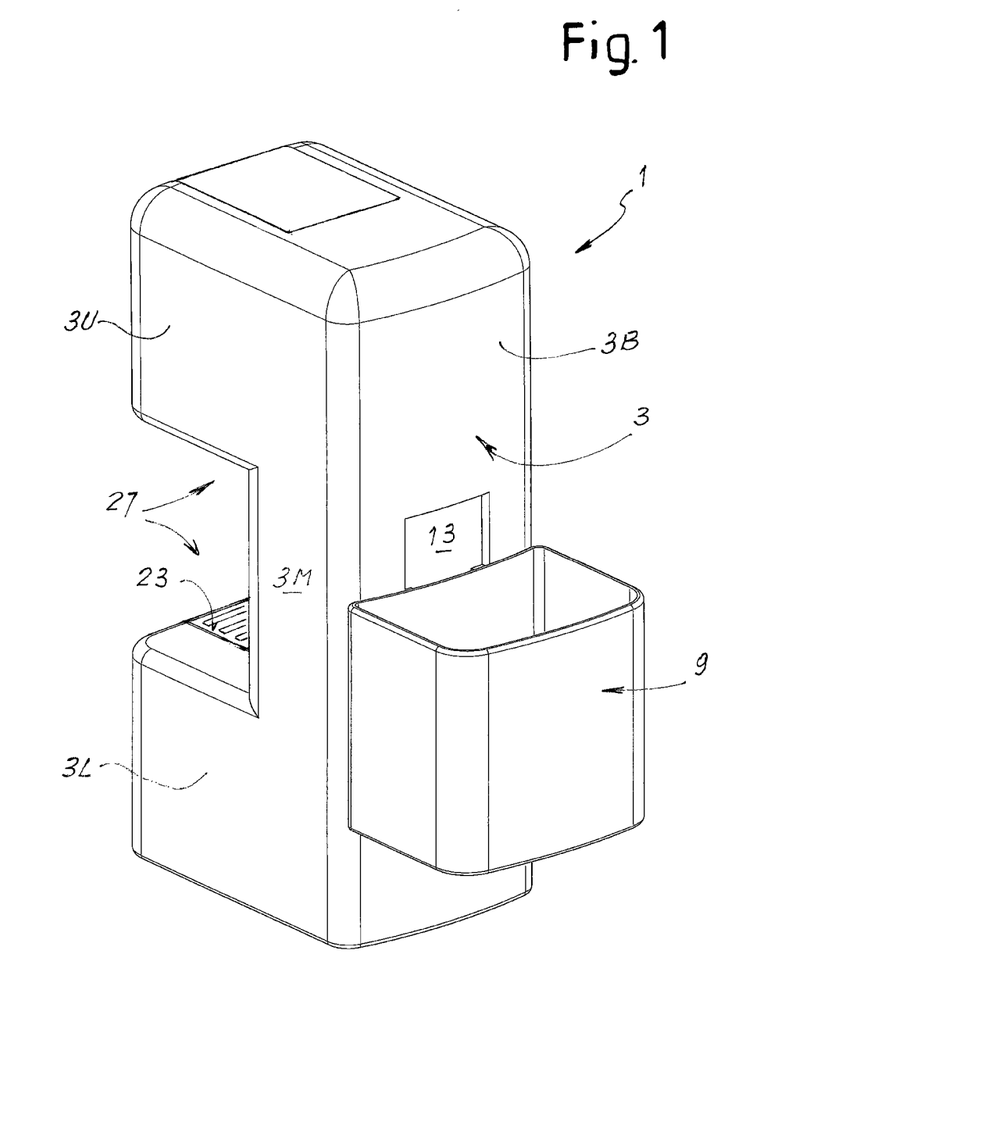
FIG. 1 shows a perspective back view of a beverage producing device in one embodiment.
Figure 2:
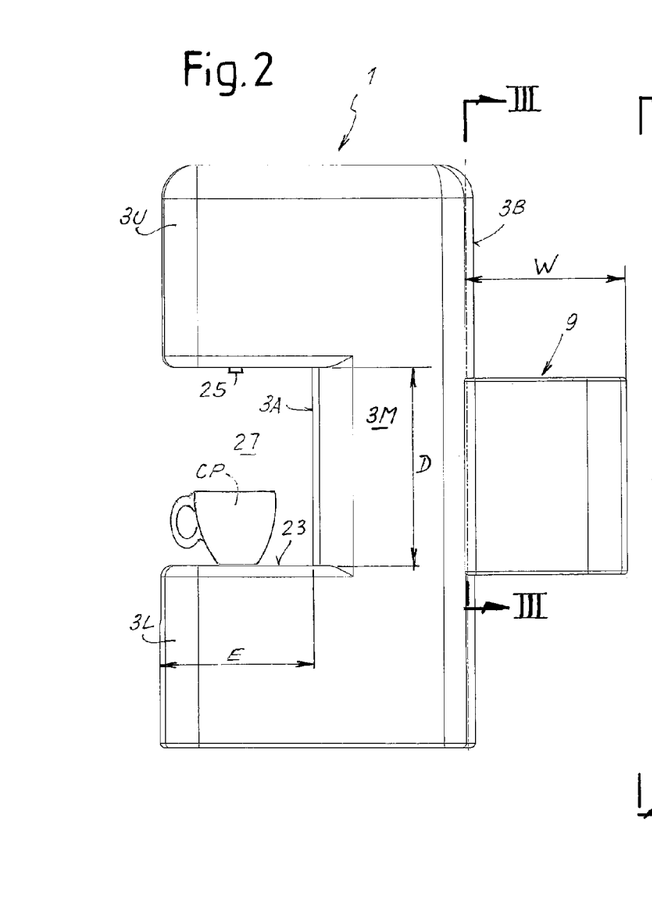
FIG. 2 shows a side view of the device of FIG. 1.
Figure 3:
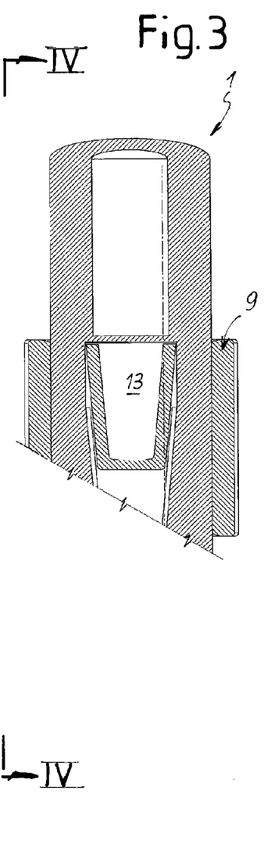
FIG. 3 shows a cross-section according to line 3-3 in FIG. 2.
Figure 4:
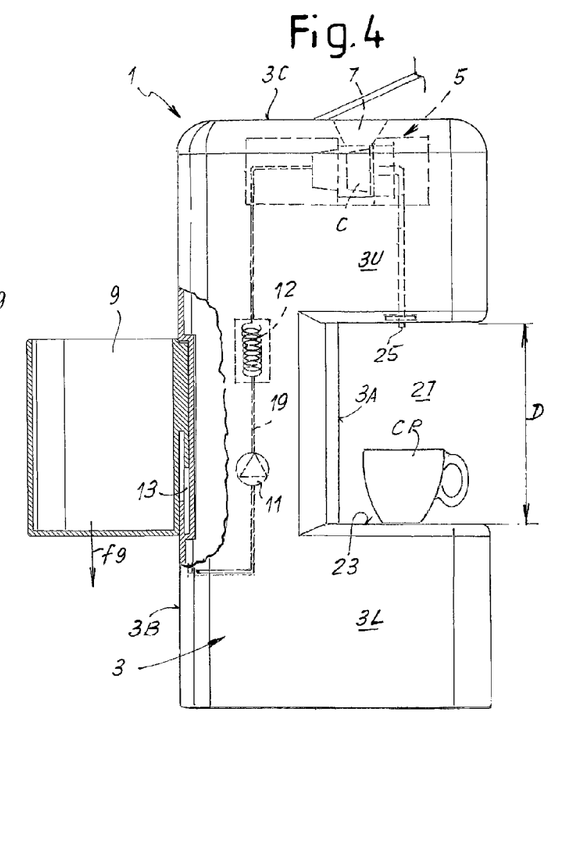
FIG. 4 shows a side view and partial cross-section according to line 4-4 in FIG. 3.

The beverage producing device, e.g. a coffee machine, is labelled 1 as a whole. The device 1 comprises a housing 3 with a main body 3M. The housing 3 includes a front side 3A and a back side 3B.

The housing 3 contains several apparatuses, instrumentalities, components and elements, which may vary depending on the kind of device, and which are known per se to those skilled in the art. In some embodiments within the housing 3 a brewing unit 5 is arranged, which receives the ingredients for the preparation of the beverage. A brewing unit shall be understood as being any arrangement capable of receiving ingredients for the preparation of a beverage and hot and/or pressurized water which, flowing through the ingredients, produces the beverage by dilution, extraction or in any other manner.

In some embodiments the ingredients can be packaged in single dose capsules, pods or cartridges C which can be introduced into the brewing unit 5 through a top aperture 7 provided on the top side 3C of the housing 3. In other embodiments, not shown, the brewing unit can be combined to a grinding device, associated to a bean container. Coffee beans are dispensed from the bean container to the grinder, which in turn grinds the beans to produce coffee powder which is then loaded in the brewing unit 5.

The brewing unit 5 is usually fed with hot water taken from a water container 9 which will be described in more detail here below. Water is pumped by a pump 11 from the water container 9 and flows through a water heater 12, the water heater being in fluid connection with the brewing unit 5. Hot pressured water is therefore fed in the brewing unit 5 and is used to extract flavours from the edible ingredients contained in the capsule, pod or cartridge C. In other embodiments, not shown, the brewing unit can be designed to be used in combination with ingredients which are fed in bulk form in the brewing chamber. For example, the device can be provided with a coffee grinder which produces coffee powder from coffee beans dispensed from a coffee bean container. In other embodiments, the coffee powder or other ingredient for the preparation of the beverage can be loaded directly in the brewing unit by the user in a loose or bulk form.

As mentioned above, the number and kind of inner components of the device 1 can vary according to needs and based on the device design, the kind of beverage which the device shall produce, the kind of ingredients and package thereof usable in connection with the brewing unit 5 and so on. It shall be understood that those mentioned above are only a selection of possible components of the coffee producing device 1.

The water container 9 is connected in a reversible manner to the housing 3.

In the embodiment shown the water container 9 is connected to the back side 3B of the housing 3. In other embodiments the water container 9 could be attached laterally to the housing 3. Attaching the water container 9 to the back side of the housing 3 is currently preferred because this reduces the front dimension of the beverage producing device 1 and makes it easier to arrange the device 1 also in an environment where little room is available. The front dimension of the device corresponds in this case to the front dimension of the housing without any additional part projecting from the left or right side of the housing 3.

The water container 9 is attached to the housing 3 by means of an engaging member which allows easy detachment of the container 9 when the latter must be replenished and/or when it is desired to replace the water container 9 in a recovery seat formed within the housing 3 as will be explained later on, for example when the device 1 has to be packaged, shipped or stored.

In the embodiment disclosed in the attached drawings the back side 9B of the water container 9 is provided with a V shaped projection 11. The V-shaped or U-shaped projection 11 has an L-shaped cross-section forming a channel 11C developing around the projection 11. Correspondingly, the back side 3B of the housing 3 comprises a recess 13 which has V-shaped or U-shaped edges 13E, the shape of which substantially corresponds to the shape of the projection 11 provided on the back side 9B of the water container 9.

The water container 9 is therefore attached to the back side of the housing 3 of the device 1 by introducing the projection 11 into the recess 13 and moving the water container 9 downwards (arrow f9 in FIG. 4) until the channel 11C formed by the projection 11 engages the edges 13E of the recess 13. In this manner the water container 9 is safely supported in a cantilever fashion from the backside 3B of the housing 3. The water container 9 can be easily disengaged from the back side 3B of the housing 3 by simply lifting the container in a direction opposite to arrow f9, such that the projection 11 becomes disengaged from the edges 13E surrounding the lower portion of the aperture of recess 13.

Figure 5:
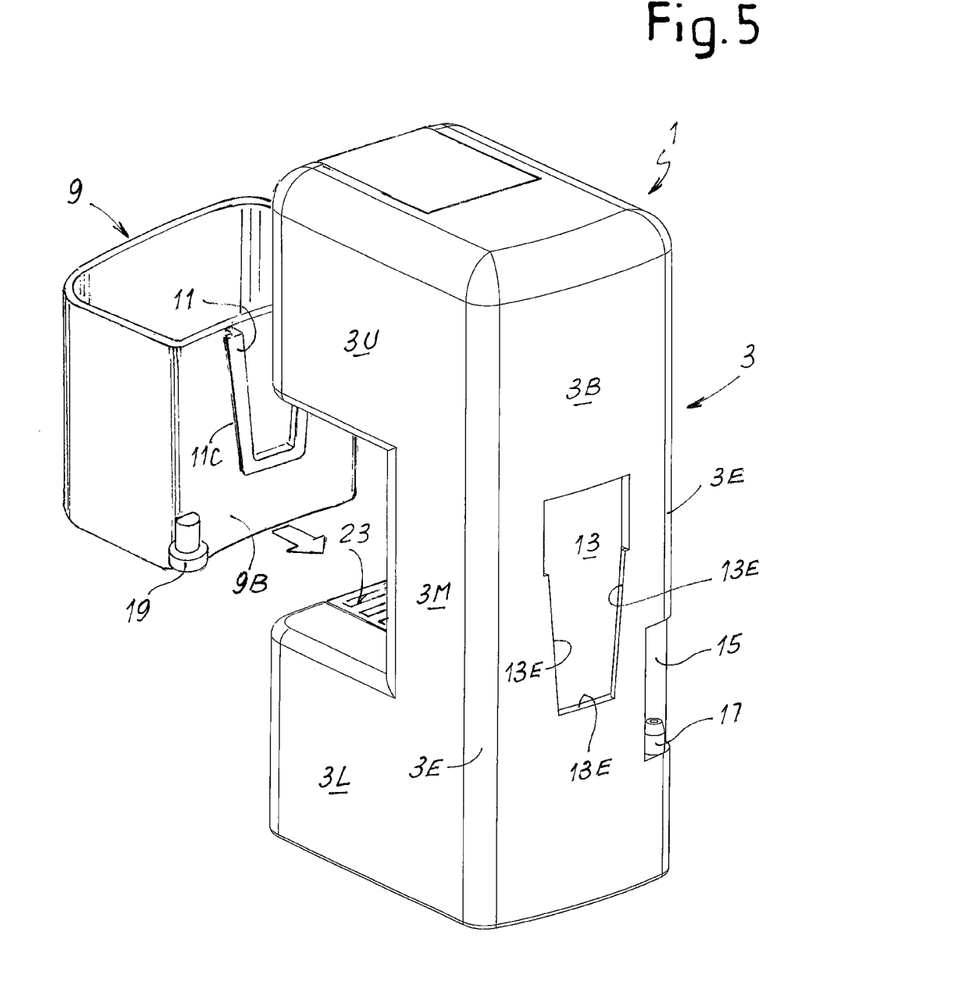
FIG. 5 shows a perspective view from the back of the device of FIG. 1 to 4 with the water container separated.
Figure 6:
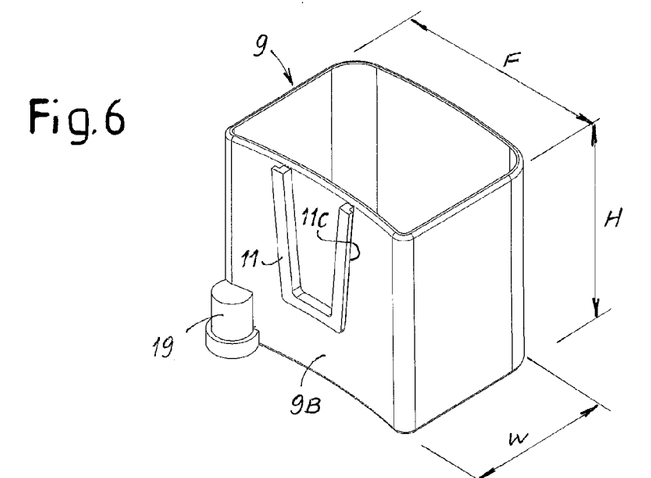
FIG. 6 shows a perspective view of the water container in isolation.

As can be appreciated in particular in FIG. 5, where the water container 9 has been removed from the back side 3B of the housing 3, along one of the edges 3E of the housing 3 a niche 15 is provided. In the bottom of said niche 15 a water inlet connection 17 is provided. The water inlet connection 17 is in fluid communication with the pump 11, for example through a pipe 19 schematically shown in FIG. 4.

Correspondingly along an edge of the water container 9 a water outlet 19 is arranged. The position of the water outlet 19 is such that it engages the water inlet connection 17 when the water container 9 is attached to the back side 3B of the housing 3. The water outlet 19 of the water container 9 has a valve 21 which is closed when the water container 9 is not connected from the water inlet connection 17 and is opened by the insertion of the water inlet connection 17 into the water outlet 19 when the water container 9 is properly attached in the correct position to the back side 3B of the housing 3. (see FIGS. 8 and 9)

With this arrangement a fluid connection is easily established between the water container 9 and the pump 11 once the water container 9 is attached to the device 1.

Frontally, the housing 3 forms two projections or extensions from the main body 3M of the housing: a first lower projection 3L and a second upper projection 3U. The lower projection 3L has an upper surface 23 forming a cup support on which a cup CP can be positioned, for collecting the beverage produced by the device 1. The upper surface 23 is preferably apertured, e.g. in the form of a grid, and can be placed above a drip tray. The upper projection 3U extends above the lower projection 3L and houses a beverage dispensing spout, i.e. a beverage dispensing nozzle, schematically shown at 25. The beverage dispensing spout 25 is in fluid connection with the brewing unit 5 so as to dispense the beverage, for example coffee, produced by the brewing unit 5 into the cup CP arranged on the support formed by the surface 23.

The distance D between the lower surface of the upper projection 3U and the surface 23 of the lower projection 3L is chosen such that the water container 9 can be housed in the recovery seat 27 formed between the front side 3A of the main body 3M of the housing 3 and the opposing surfaces of the upper projection 3U and the lower projection 3L. The dimension (E) in the direction orthogonal to the front side 3A of the upper projection 3U and the lower projection 3L corresponds approximately to the width W of the water container 9. The front dimension F of said water container 9 corresponds to the front dimension of the housing 3. The height H of the water container 9 is equal to or slightly less than the distance D between the two opposing surfaces of the upper and lower projections 3U and 3L.

In this manner, the water container 9 can be housed in the recovery seat 27 when the device 1 is not in use, without projecting therefrom. The footprint of the device 1 with the water container 9 recovered in the recovery seat 27 becomes identical to the footprint of the housing 3. In some embodiments, at least one dimension of the water container 9 can be smaller than the corresponding dimension of the recovery seat 27.

Figure 7:
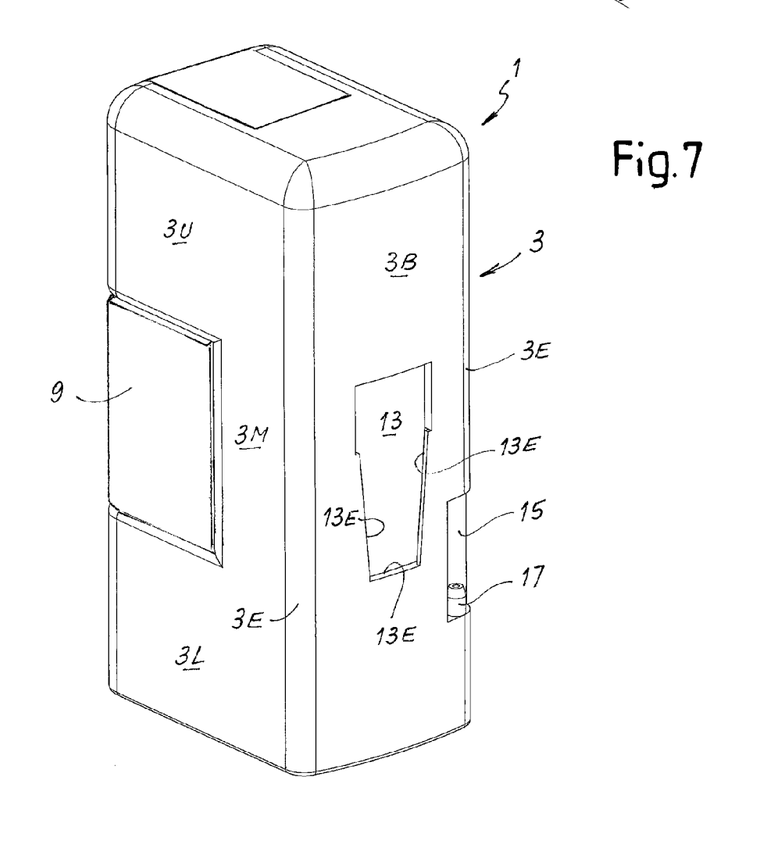
FIG. 7 shows the device with the water container recovered in the recovery seat arranged in the front area of the housing.
Figure 8:
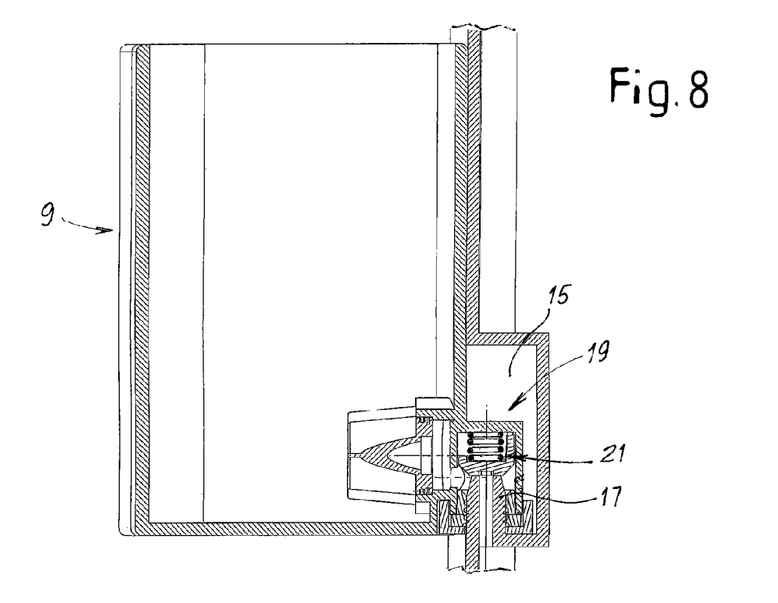
FIG. 8 shows a cross-section of the water container and a part of the housing in a working position.
Figure 9:
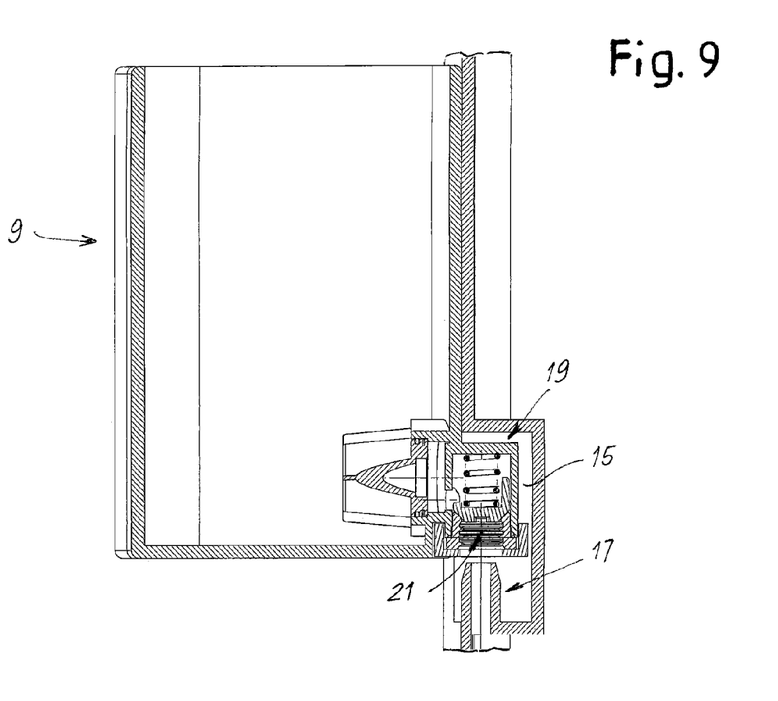
FIG. 9 shows a cross-section of the water container and a part of the housing in a non-working position.
Figure 10:
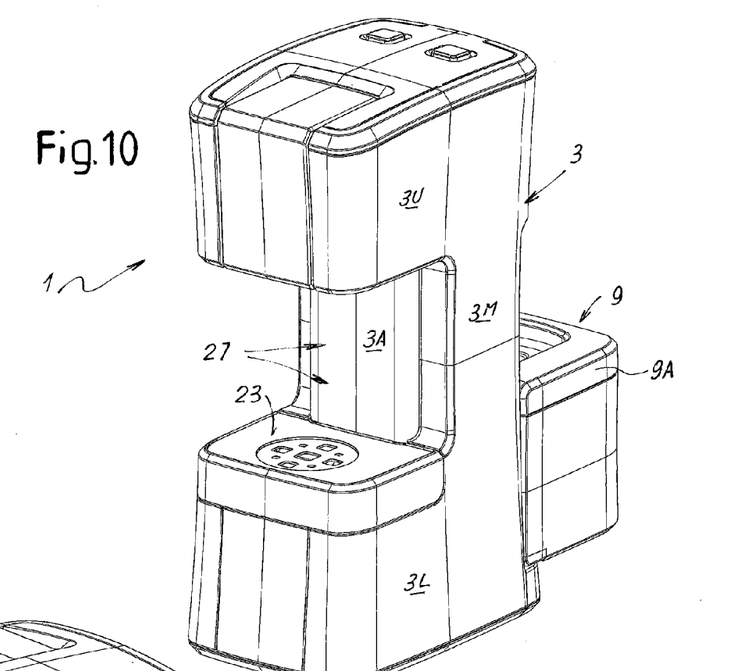
FIG. 10 shows a perspective front view of a further embodiment of the device, with the water container attached to the housing in the working position.
Figure 11:
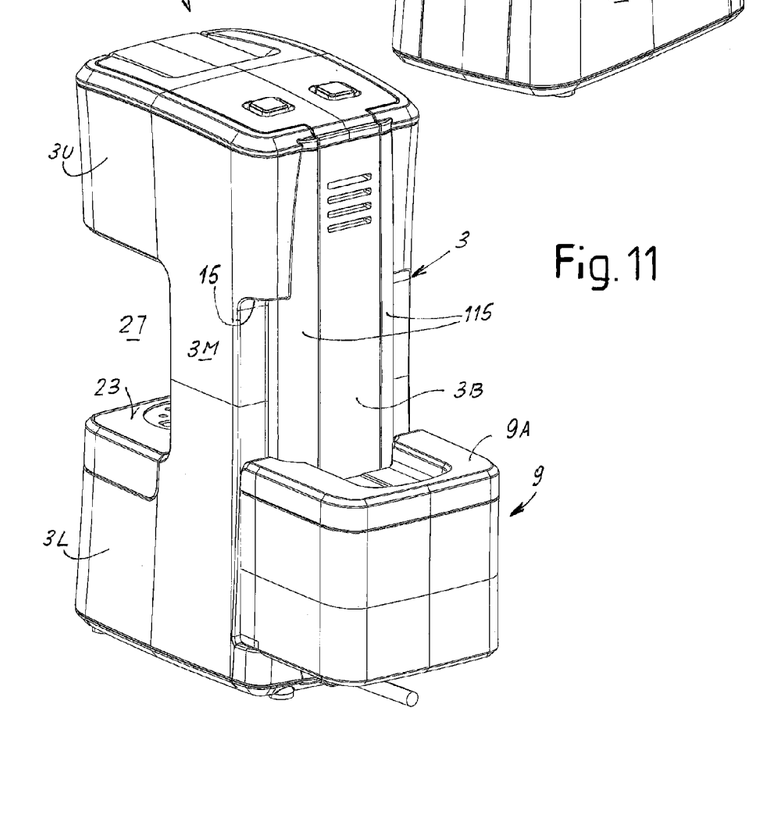
FIG. 11 shows the same device in a perspective back view.
Figures 12, 13:
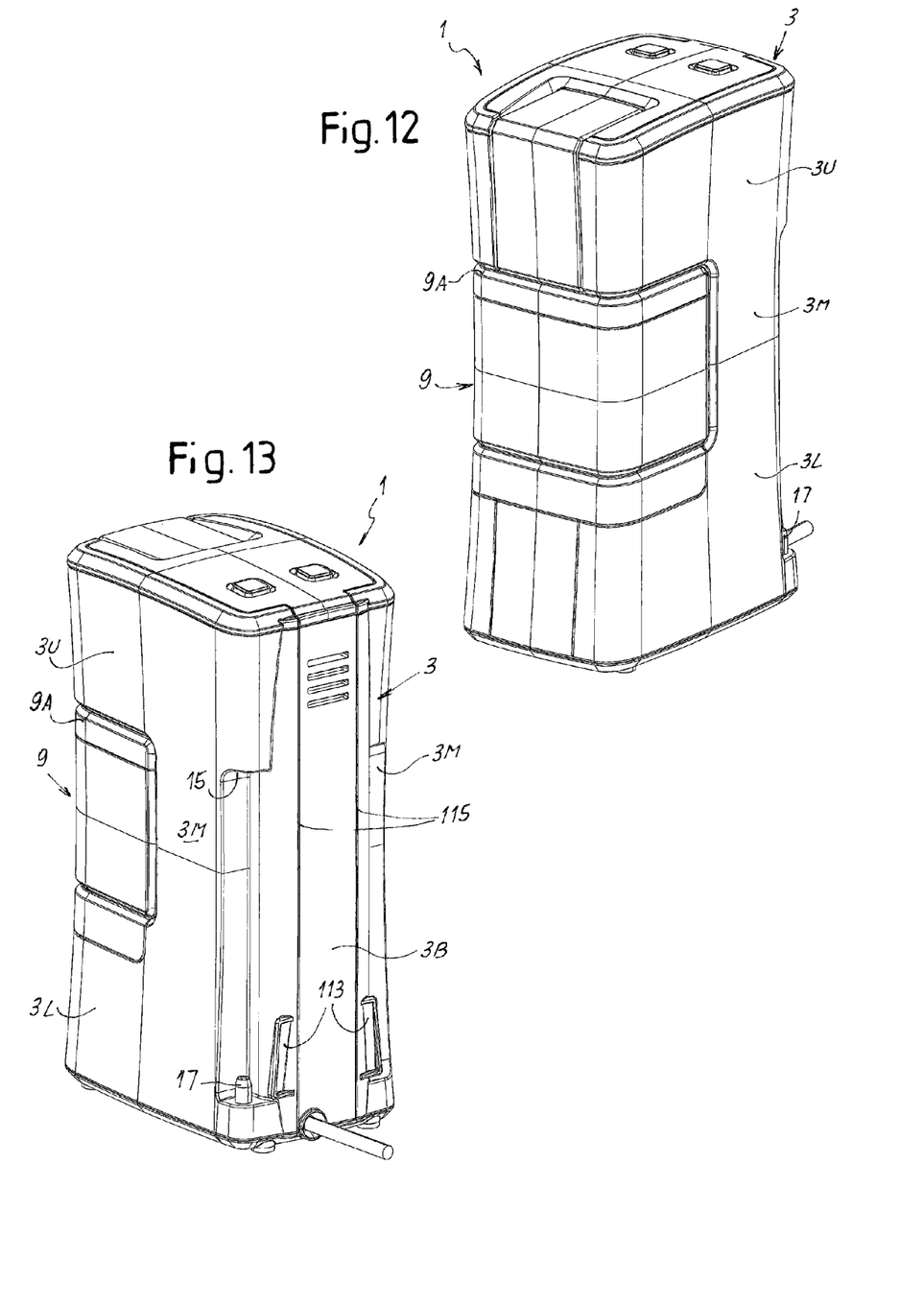
FIGS. 12 and 13 show perspective views similar to FIGS. 10 and 11, with the water container recovered in the recovery seat.
Figure 14:
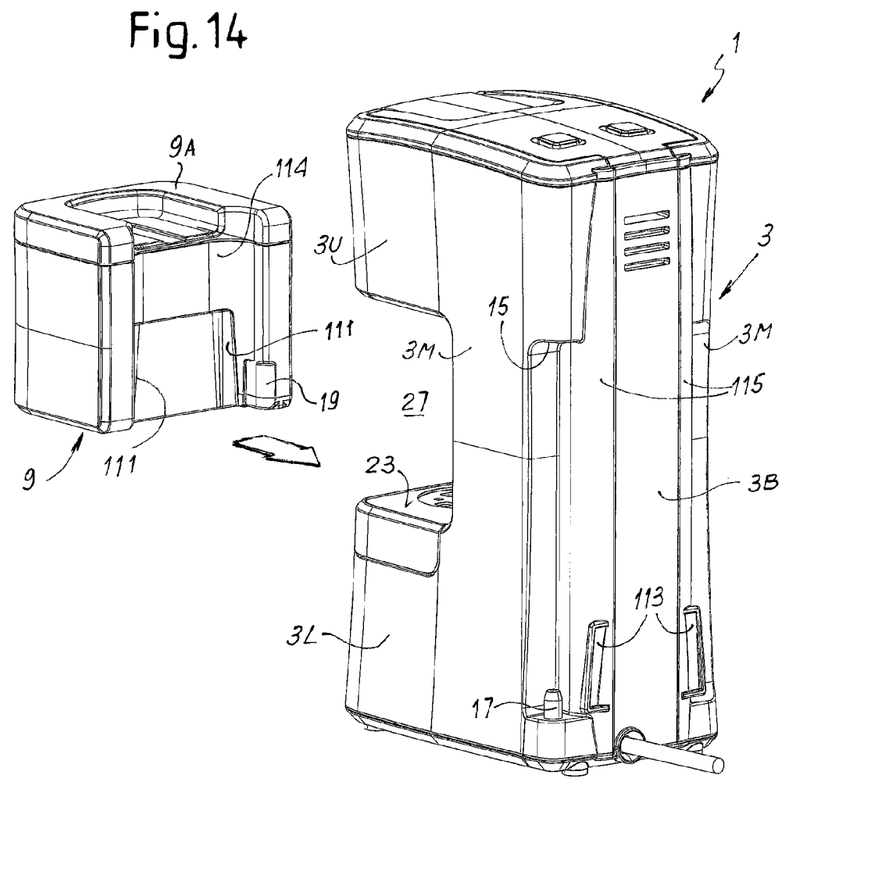
FIG. 14 shows a perspective view of the device of FIGS. 10 to 13, with the water container being introduced in the recovery seat.

As can be appreciated from FIG. 7, the overall dimension of the device 1 when the water container 9 is placed inside the recovery seat 27 becomes extremely limited and makes it easy for the device 1 to be packaged, stored, transported or put away.

FIGS. 10 to 14 show a modified embodiment of a device embodying the invention. The same reference numbers designate the same or equivalent parts described above and shown in FIGS. 1 to 9. A short description will be given here below, of those parts, components or elements which differ from the previously described embodiment.

In FIGS. 10 to 14 the water container 9 is shown with the cover thereof 9A. It should be understood that a cover can be provided also for the container of FIGS. 1-10 and that such cover has been omitted.

In FIGS. 10-14 the water container 9 has slots 111 formed in a recess 114 provided on the back of the water container 9. The back side 3B of the housing 3 forms a longitudinal projection 115 along which the recess 114 of the container 9 can be engaged. Two edges 113 projects laterally from opposing side walls of the longitudinal projection 115. The edges 113 are shaped such as to diverge from one another from the top end towards the bottom end thereof. The water container 9 is engaged to the housing 3 of the device 1 by sliding the water container 9 along the longitudinal projection 115 downwards until the edges 113 engage the slots 111 provided in the recess 114, such that a mechanical connection of the water container 9 on the housing 3 is obtained. The water container is thus cantileverly supported on the back side of the housing 3.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage producing device, comprising a housing and a removable water container being designed to be connected to said housing in an operative position in fluid communication with a water inlet connection, when the device is in use, and said removable water container being designed to be detachable from said water inlet connection and receivable in an inoperative position inside a seat provided in said device, when the device is not in use, wherein the beverage producing device comprises—a cup support, projecting front a front side of said housing;

an upper projection extending from said front side of said housing at least one beverage dispensing spout arranged on said upper projection and arranged at a distance from said cup support;

wherein in that said upper projection and said cup support form there between said seat for said removable water container.

2. Beverage producing device according to claim 1, wherein in said operative position said water container is arranged at least partly outside said housing.

3. Beverage producing device according to claim 1, wherein said seat is formed by said housing or parts thereof.

4. Beverage producing device according to claim 1, comprising a beverage producing unit arranged in said housing and in fluid communication with said water inlet connection.

5. Beverage producing device according to claim 1, wherein when said water container is received in said seat, said water container is contained within a footprint of the housing.

6. Beverage producing device according to claim 1, wherein said water container comprises a projection and said housing comprises a recess, or said water container comprises a recess and said housing comprises a projection, and wherein said water container is connected to said housing by mutually engaging said projection and said recess.

7. Beverage producing device according to claim 1, wherein said seat is formed between at least two parts projecting from a main body of the housing.

8. Beverage producing device according to claim 7, wherein a first one of said two parts comprises a cup support, and a second one of said two parts is a projection supporting at least one beverage dispensing spout, said beverage dispensing spout being oriented towards said cup support.

9. Beverage producing device according to claim 1, wherein said housing has a back side opposite said front side, and wherein said back side is provided with an engaging member for removably engaging said removable water container to said housing when said water container is in said operative position.

10. Beverage producing device according to claim 9, wherein said engaging member is designed and arranged to engage said water container to said housing by moving said water container vertically downwardly along said back side of said housing.

11. Beverage producing device according to claim 1, wherein said housing comprises a niche; wherein said water inlet connection is arranged in said niche, and wherein said water container comprises a water outlet, arranged at the bottom of said water container for engagement with said water inlet connection when said water container is engaged to said housing.

12. Beverage producing device according to claim 11, wherein said niche is arranged at the back side of said housing.

13. Beverage producing device according to claim 11, wherein said niche is arranged along an edge of the back side of said housing.

14. Beverage producing device according to claim 1, comprising a locking arrangement for reversibly retaining said water container in said seat.

\* \* \* \* \*